Nov. 6, 1934.  P. W. JANEWAY, JR  1,980,062
BOLTED PIPE JOINT
Filed July 24, 1933
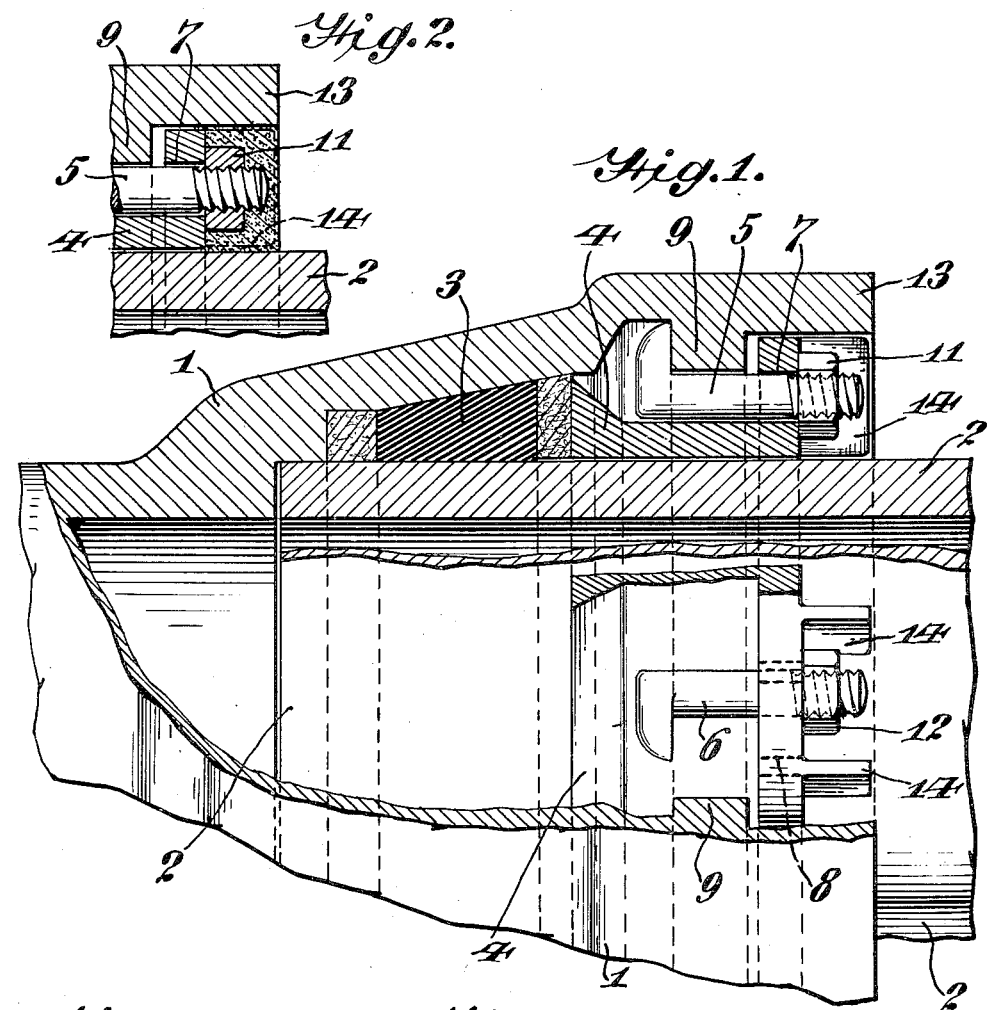
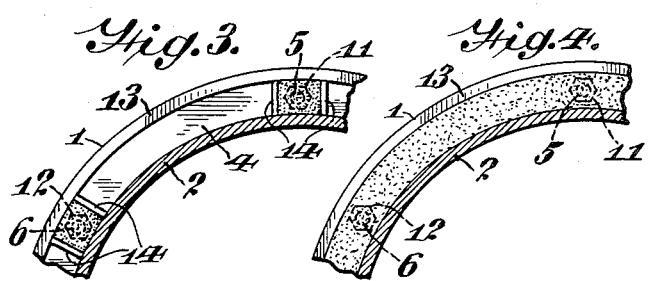
Inventor
Price W. Janeway, Jr.,
By Augustus B. Stoughton,
Attorney Patented Nov. 6, 1934

1,980,062

UNITED STATES PATENT OFFICE 1,980,062

BOLTED PIPE JOINT

Price W. Janeway, Jr., Media, Pa., assignor to The United Gas Improvement Company, Philadelphia, Pa., a corporation of Pennsylvania Application July 24, 1933, Serial No. 681,941

5 Claims. (Cl. 285—17)

The present invention relates to bolted pipe joints for underground metal piping.

Recent tests have shown that in typical bolted metal pipe joints, exposed to electrolytic corrosion the bolts and nuts bear a disproportionate part of the metal lost by the joint, and failure of the joint may frequently occur due to corrosion of the bolts and nuts while the rest of the joint has a very considerable margin of metal that could be lost before failure.

The principal object of the present invention is to provide a bolted bell and spigot joint in which the bolts are protected from such corrosion.

The invention will be described in connection with the attached drawing which forms a part of this specification and which shows in partial elevation and partial cross section the apparatus embodying features of the invention.

In the following description reference will be made to the accompanying drawing forming part hereof and in which Figure 1 is a view, partly in section and partly in elevation, of a portion of a pipe joint embodying features of the invention.

Fig. 2 is a detached sectional view illustrating a nut and its bolt end enveloped in insulating material.

Fig. 3 is a view drawn to a reduced scale and illustrating the right hand end of the joint shown in Fig. 1, and Fig. 4 is a view illustrating a modification of the construction shown in Fig. 3.

Referring to Figure 1, 1 generally indicates the bell of a pipe section. 2 generally indicates the spigot of an adjoining section. 3 is an elastic packing ring, driven into the joint by the follower ring 4 by hook bolts, two of which are shown at 5 and 6. The hook bolts are arranged to pass through slotted bolt holes in the follower ring indicated in cross section across the short dimension at 7 and shown lengthwise dotted at 8.

The bell is provided with an annular lug 9 formed on the interior of its wall, which projects inward sufficiently to permit the hooks of the bolts to extend under the lug when the bolts are rotated from the position shown for bolt 6, into the position shown for bolt 5. The hooks of the bolts are made sufficiently long so that they strike the wall of the bell below the lug, when rotated preventing the bolts from being turned all the way around and out of engagement with the lug 9. The bolts are drawn up by nuts as for instance nuts 11 and 12 which extend over the slotted bolt holes.

The end of the bell is extended at 13 to project beyond the nuts and threaded ends of the bolts, forming an annular pocket, bounded by the bell the spigot and the follower ring. If desired lugs such as 14 may be provided on the follower ring, forming individual pockets around each bolt end and nut.

In assembling the joint the follower ring 4 is slipped over the end of the spigot 2 followed by the packing ring 3 and the spigot inserted in the bell. The bolts are inserted through the slots in the follower ring and the nuts threaded on the ends of the bolts. The bolts are rotated into the position shown for bolt 5, with the hooks under the lug 9 and the ends of the hooks against the wall of the bell, the nuts are drawn up and the packing ring 3 compressed into the joint.

The pocket formed by the end of the bell, the spigot and the follower ring is filled with a plaster electrically insulating material such as pitch or cement, covering the nuts and ends of the bolts and forming an enclosed joint in which the bolts are protected from electrolytic corrosion. If the lugs 14 are provided the individual pockets formed around the ends of the bolts by the lugs, end of the bell, spigot and follower ring, may be filled with insulating material instead of filling the entire annular pocket.

It will be seen from the above that the invention provides a bolted bell and spigot joint in which the bolts are protected from electrolytic corrosion in a simple and effective manner. The joint is easy to assemble and take apart, and is easier to test for leakage with a soap solution than joints in which the bolts and follower rings are projecting about the joint.

It will be obvious to those skilled in the art that modifications may be made in details of construction and arrangement and in matters of mere form without departing from the spirit of the invention which is not limited to such matters, or otherwise than the prior art and the appended claims may require.

I claim:

1. Means for restricting the electrolytic corrosion loss of metal from the bolts and nuts of pipe joints, comprising the combination with bell and spigot sections of the pipe joint and the follower ring of the pipe joint, of an internal flange arranged on the bell section, an external flange on the follower ring provided with oblong slots, an extension of the bell defining with the spigot section of the joint a pocket, hook bolts insertable through the oblong slots and turnable to put their hooks into contact with the inner face of the bell section and into engagement with the internal flange thereon, nuts on the bolts arranged in the pocket, and insulating material enveloping the nuts and bolt ends and arranged in the pocket.

2. Means for restricting the electrolytic corrosion loss of metal from the bolts and nuts of pipe joints, comprising the combination with bell and spigot sections of the pipe joint and the follower ring of the pipe joint, of an internal flange arranged on the bell section, and external flange on the follower ring, an extension of the bell defining with the spigot section of the joint, a pocket, hook bolts turnable to put their hooks into contact with the inner face of the bell section and into engagement with the internal flange thereon, nuts on the bolts arranged in the pocket, and insulating material enveloping the nuts and bolt ends and arranged in the pocket.

3. Means for restricting the electrolytic corrosion loss of metal from the bolts and nuts of pipe joints, comprising the combination with bell and spigot sections of the pipe joint and the follower ring of the pipe joint, of an internal flange arranged on the bell section, an external flange on the follower ring provided with oblong slots, an extension of the bell and lugs on the face of the follower ring defining with the spigot section of the pipe joint a series of pockets, hook bolts engaging the internal flange on the bell section, nuts on the bolts arranged respectively in the pockets, and insulating material enveloping the nuts and bolt ends and arranged in the pockets.

4. Means for restricting the electrolytic corrosion loss of metal from the bolts and nuts of pipe joints, comprising the combination with bell and spigot sections of the pipe joint and the follower ring of the pipe joint, of an internal flange arranged on the bell section, and external flange on the follower ring, an extension on the face of the follower ring defining a pocket, hook bolts engaging the internal flange on the bell section, nuts on the bolts arranged in the pocket, and insulating material enveloping the nuts and arranged in the pocket.

5. Means for restricting the electrolytic corrosion loss of metal from the bolts and nuts of pipe joints, comprising the combination with bell and spigot sections of the pipe joint and the follower ring of the pipe joint, of an internal flange arranged on the bell section, an external flange on the follower ring, an extension of the bell with the spigot defining a pocket, hook bolts engaging the internal flange on the bell section, nuts on the bolts arranged in the pocket, and insulating material enveloping the nuts and arranged in the pocket.

PRICE W. JANEWAY, Jr.